United States Patent
Cudak et al.

(10) Patent No.: US 9,195,658 B2
(45) Date of Patent: *Nov. 24, 2015

(54) MANAGING DIRECT ATTACHED CACHE AND REMOTE SHARED CACHE

(71) Applicant: LENOVO ENTERPRISE SOLUTIONS (SINGAPORE) PTE. LTD., Singapore (SG)

(72) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 224 days.

This patent is subject to a terminal disclaimer.

(21) Appl. No.: 13/712,448

(22) Filed: Dec. 12, 2012

(65) Prior Publication Data

US 2014/0164548 A1    Jun. 12, 2014

(51) Int. Cl.
   G06F 15/16    (2006.01)
   G06F 17/30    (2006.01)

(52) U.S. Cl.
   CPC .......... *G06F 17/30* (2013.01); *G06F 17/30781* (2013.01); *G06F 17/30902* (2013.01)

(58) Field of Classification Search
   CPC .................................................. H04L 67/2847
   USPC ......................................................... 709/213
   See application file for complete search history.

(56) References Cited

U.S. PATENT DOCUMENTS

| | | | |
|---|---|---|---|
| 7,353,319 B2 | 4/2008 | Speier et al. | |
| 7,565,489 B2 * | 7/2009 | Mullender et al. | 711/118 |
| 7,975,018 B2 | 7/2011 | Unrau et al. | |
| 2002/0133537 A1 * | 9/2002 | Lau et al. | 709/203 |
| 2006/0143256 A1 * | 6/2006 | Galchev et al. | 707/206 |
| 2006/0248124 A1 * | 11/2006 | Petev et al. | 707/201 |
| 2007/0005892 A1 * | 1/2007 | Mullender et al. | 711/118 |
| 2009/0144388 A1 * | 6/2009 | Gross et al. | 709/213 |
| 2010/0082907 A1 * | 4/2010 | Deolalikar et al. | 711/133 |
| 2010/0153634 A1 * | 6/2010 | Fellinger et al. | 711/104 |
| 2012/0259969 A1 * | 10/2012 | Mastrangelo et al. | 709/224 |
| 2012/0278424 A1 * | 11/2012 | Zohar et al. | 709/213 |

(Continued)

OTHER PUBLICATIONS

Cade et al., "Balancing Locality and Parallelism on Shared-cache Mulit-core Systems", 11th IEEE International Conference on High Performance Computing and Communications (HPCC'09), Jun. 2009, pp. 188-195, Institute of Electrical and Electronics Engineers Computer Society (IEEE.org), Digital Object Identifier: 10.1109/HPCC.2009.61, USA.

(Continued)

*Primary Examiner* — Hamza Algibhah
(74) *Attorney, Agent, or Firm* — Edward J. Lenart; Katherine S. Brown; Kennedy Lenart Spraggins LLP

(57) ABSTRACT

Managing direct attached cache and remote shared cache, including: receiving from an enclosure attached server, by an enclosure that includes enclosure cache, a request for data; determining, by the enclosure, whether the data has been requested by a predetermined number of enclosure attached servers; and responsive to determining that the data has been requested by a predetermined number of enclosure attached servers, marking, by the enclosure, the data as enclosure level cacheable.

11 Claims, 5 Drawing Sheets

(56) References Cited

U.S. PATENT DOCUMENTS

| 2013/0042070 | A1* | 2/2013 | Jalal et al. | 711/130 |
|---|---|---|---|---|
| 2013/0054883 | A1* | 2/2013 | Sihare | 711/105 |
| 2013/0219021 | A1* | 8/2013 | Acharya et al. | 709/219 |
| 2013/0268733 | A1* | 10/2013 | Narayanan et al. | 711/119 |
| 2013/0290462 | A1* | 10/2013 | Lim et al. | 709/213 |
| 2014/0164549 | A1* | 6/2014 | Cudak et al. | 709/213 |

OTHER PUBLICATIONS

Yoon et al., "A Row Buffer Locality-Aware Caching Policy for Hybrid Memories", Proceedings of the 30th IEEE International Conference on Computer Design (ICCD'12), Montreal, Quebec, Canada, Sep. 2012, 2 pp., [accessed Sep. 21, 2012], URL: http://www.ece.cmu.edu/~safari/pubs/rbla_nvmw2012_abstract.pdf.

Jiang et al., "A Locality-Aware Cooperative Cache Management Protocol to Improve Network File System Performance", Proceedings of the 26th IEEE International Conference on Distributed Computing Systems (ICDCS'06), Jul. 2006, 8 pp., Institute of Electrical and Electronics Engineers Computer Society (IEEE.org), Digital Object Identifier: 10.1109/ICDCS.2006.9, USA.

Wang et al., Exploit Temporal Locality of Shared Data in SRC Enabled CMP, Proceedings of the 2007 IFIP International Conference on Network and Parallel Computing (NPC'07), Sep. 2007, pp. 384-393, (abstract only), Springer-Verlag Berlin, Heidelberg, ISBN:3-540-74783-4 978-3-540-74783-3.

Wikipedia, "Web Cache", en.wikipedia.org (online), Sep. 2012 [accessed Sep. 21, 2012], 1 pp., URL: http://en.wikipedia.org/wiki/Web_cache.

Wu et al., "Latency-Sensitive Hashing for Collaborative Web Caching", 9th International World Wide Web Conference, www9.org (online), May 2000, [accessed Sep. 21, 2012], 19 pp., URL: http://www9.org/w9cdrom/301/301.html.

Docwiki, "Network Caching Technologies", docwiki.cisco.com (online), Sep. 2012, [accessed Sep. 21, 2012], 16 pp., URL: http://docwiki.cisco.com/wiki/Network_Caching_Technologies.

Palmer et al., "Shared Memory Mirroring for Reducing Communication Overhead on Commodity Networks", Proceedings—IEEE International Conference on Cluster Computing, Dec. 2003, pp. 420-428, Institute of Electrical and Electronics Engineers Computer Society (IEEE.org), Digital Object Identifier: 10.1109/CLUSTR.2003.1253342.

* cited by examiner

MANAGING DIRECT ATTACHED CACHE AND REMOTE SHARED CACHE

BACKGROUND OF THE INVENTION

1. Field of the Invention

The field of the invention is data processing, or, more specifically, methods, apparatus, and products for managing direct attached cache and remote shared cache.

2. Description of Related Art

Modern computing systems include various types of computer memory, each of which has differing access times. In order to make use of quick access memory, many computing systems implement a cache which ideally contains the most frequently accessed data. In a cached environment, direct attached cache provides the best performance with respect to latency. Non-volatile memory can be used in this space for the cache and is less expensive than DRAM, but is still expensive enough so that over provisioning the direct attached cache to cover all possible workloads and all hotspot sizes is not economical.

SUMMARY OF THE INVENTION

Methods, apparatus, and products for managing direct attached cache and remote shared cache, including: receiving from an enclosure attached server, by an enclosure that includes enclosure cache, a request for data; determining, by the enclosure, whether the data has been requested by a predetermined number of enclosure attached servers; and responsive to determining that the data has been requested by a predetermined number of enclosure attached servers, marking, by the enclosure, the data as enclosure level cacheable.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Example methods, apparatus, and products for managing direct attached cache and remote shared cache in accordance with the present invention are described with reference to the accompanying drawings, beginning with FIG. 1. For further explanation, FIG. 1 sets forth a block diagram of automated computing machinery for managing direct attached cache and remote shared cache according to embodiments of the present invention. The example of FIG. 1 includes an enclosure (202) that includes enclosure cache (204). An enclosure (202) is a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure cache (204) of FIG. 1 may be embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

Figure 1:
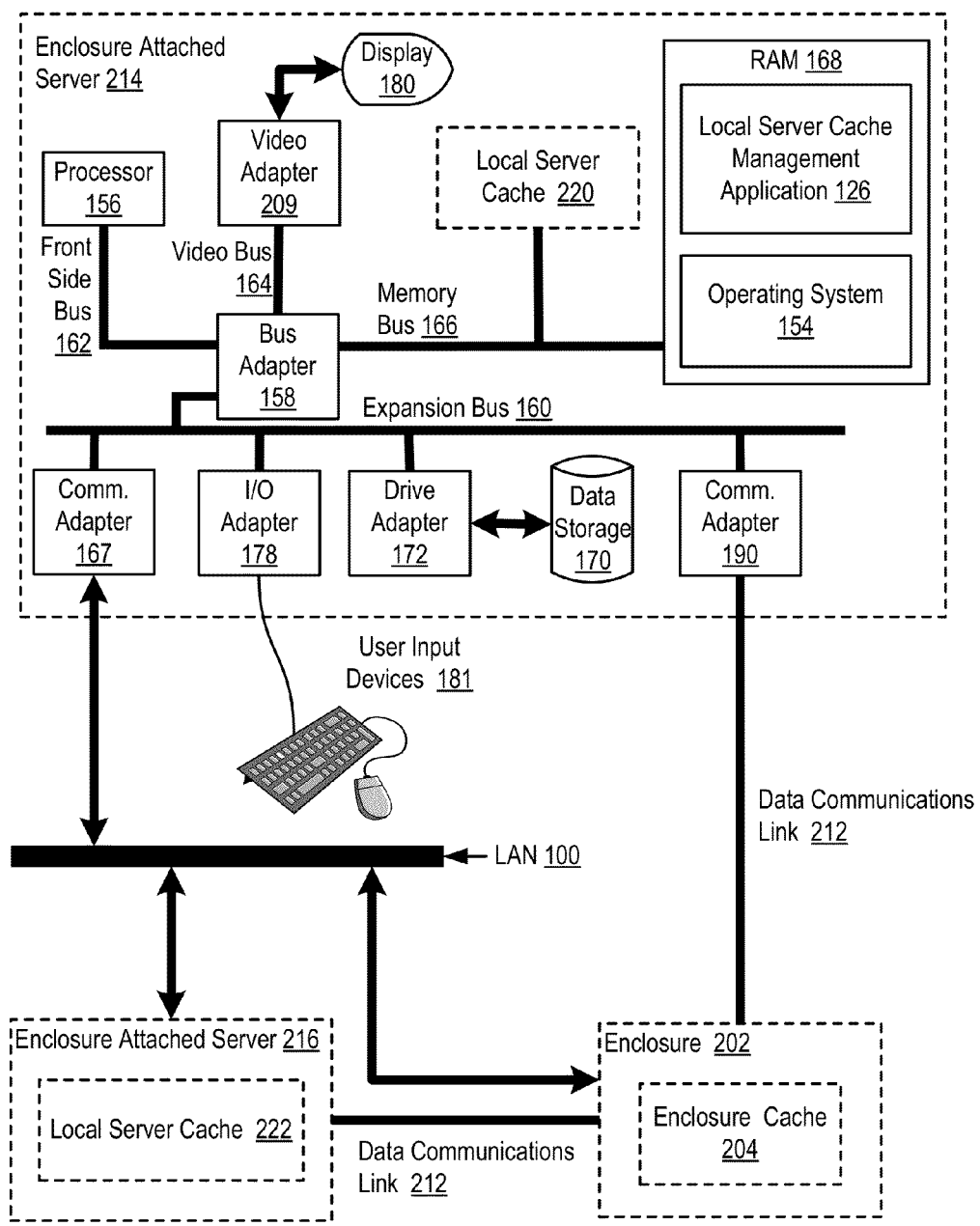
FIG. 1 sets forth a block diagram of automated computing machinery for managing direct attached cache and remote shared cache according to embodiments of the present invention.

FIG. 1 also includes a plurality of enclosure attached servers (214, 216), each of which includes local server cache (220, 222). The enclosure attached servers (214, 216) may be embodied, for example, as blade servers mounted in a blade center. The enclosure attached servers (214, 216) may include computer processors, computer memory, data communications adapters, and other computing hardware such that the enclosure attached servers (214, 216) operate as a fully functional computer that can run one or more services. The enclosure attached servers (214, 216) also include local server cache (220, 222). The local server cache (220, 222) may be embodied as relatively fast access memory, such as flash memory, that resides within an enclosure attached server (214, 216). In the example of FIG. 1, the enclosure cache (204) and the local server cache (220, 222) may be embodied as identical types of computer memory that are addressed identically and provide similar access times.

In the example of FIG. 1, the enclosure attached servers (214, 216) are coupled for data communications with the enclosure (202) over a data communications link (212). The data communications link (212) may be embodied, for example, as an Ethernet link, a Fibre Channel link, an Infini-Band link, or any other data communications link that enables each of the enclosure attached servers (214, 216) to communicate with the enclosure (202). Alternatively, the data communications link (212) may also be embodied as a computer bus such as a Small Computer System Interface ('SCSI') bus, Serial Attached SCSI ('SAS') bus, Serial ATA ('SATA') bus, Universal Serial Bus ('USB'), or other computer bus that can be utilized by enclosure attached servers (214, 216) and the enclosure (202) to perform memory access operations in which the enclosure attached servers (214, 216) access memory contained in the enclosure (202).

In the example of FIG. 1, managing direct attached cache and remote shared cache includes receiving, by the enclosure (202) from an enclosure attached server (214, 216), a request for data. The request for data can represent a request that is issued by an enclosure attached server (214, 216) to retrieve a file, a document, or some other form of digital data from computer memory in the enclosure (202). The enclosure attached server (214, 216) may issue such a request, for example, in response to the enclosure receiving a request for the data from a user, from another server, and so on. In the example of FIG. 1, receiving a request for data may be carried out, for example, through the use of an expander, field-programmable gate array ('FPGA'), or other form of computer logic capable of executing computer program instructions that is contained within the enclosure (202).

Consider an example in which the enclosure attached servers (214, 216) and the enclosure (202) are used to support a website that hosts videos for sharing amongst users. In such an example, a request from a user of the website to view a particular video may be received by one of the enclosure attached servers (214). In such an example, the enclosure attached server (214) may search computer memory within the enclosure attached server (214) to determine if the enclosure attached server (214) has a copy of the requested video file. For example, the enclosure attached server (214) may search its local server cache (220) to determine a copy of the requested video file is stored in the local server cache (220). In the event that a copy of the requested video file is not stored in the local server cache (220), the enclosure attached server (214) may subsequently issue a request for data and transmit the request to the enclosure (202), which contains computer memory that is shared by one or more enclosure attached servers (214, 216). As such, the enclosure (202) can receive the request for data over the data communications link (212) coupling the enclosure (202) and the enclosure attached servers (214, 216). The request for data may include, for example, a file name for the data, an identification of an end user that requested the data from the enclosure attached server (214, 216), and so on.

In the example of FIG. 1, managing direct attached cache and remote shared cache can also include determining, by the enclosure (202), whether the data has been requested by a predetermined number of enclosure attached servers (214, 216). Continuing with the example described above in which the enclosure attached servers (214, 216) and the enclosure (202) are used to support a website that hosts videos for sharing amongst users, a user initiated request to view a particular video may be serviced by any number of the enclosure attached servers (214, 216). For example, a request from a first user for the particular video may be received by enclosure attached server (214) while a request from a second user for the same video may be received by a different enclosure attached server (216). In such an example, it is likely that the first time the enclosure attached server (214) receives a request for the video, the video will not be contained in local server cache (220) of the enclosure attached server (214) and the enclosure attached server (214) will therefore need to generate a request (226) for the data and transmit the request to the enclosure (202). Likewise, it is likely that the first time the enclosure attached server (216) receives a request for the video, the video will not be contained in local server cache (222) of the enclosure attached server (216) and the enclosure attached server (216) will therefore need to generate a request for the data and transmit the request to the enclosure (202). In such an example, the video has therefore been requested by two enclosure attached servers (214, 216).

Determining whether the data has been requested by a predetermined number of enclosure attached servers (214, 216) may therefore be carried out by the enclosure (202) retaining information identifying the number of distinct enclosure attached servers (214, 216) that have requested the data. The enclosure (202) may also retain information identifying each enclosure attached server (214, 216) has requested the data, information identifying the number of times that each enclosure attached server (214, 216) has requested the data, and so on. The information may be retained by the enclosure (202), for example, by storing the information in a table, database, or other data structure that is stored in computer memory that is accessible by the enclosure (202). Determining whether the data has been requested by a predetermined number of enclosure attached servers (214, 216) may include comparing the number of enclosure attached servers (214, 216) that have requested the data to a predetermined number that serves as a threshold value. In the example of FIG. 1, determining, by the enclosure (202), whether the data has been requested by a predetermined number of enclosure attached servers (214, 216) may be carried out, for example, through the use of an expander, FPGA, or other form of computer logic capable of executing computer program instructions that is contained within the enclosure (202).

In the example of FIG. 1, managing direct attached cache and remote shared cache can also include marking, by the enclosure (202), the data as enclosure level cacheable. Marking the data as enclosure level cacheable is carried out in response to affirmatively determining that the data has been requested by a predetermined number of enclosure attached servers (214, 216). In the example of FIG. 1, each enclosure attached server (214, 216) may include computer program instructions that prevent data that is marked as 'enclosure level cacheable' from being stored in local server cache (220, 222). The enclosure (202) may also include computer program instructions that gives special priority to data that is marked as 'enclosure level cacheable' when populating and maintaining the enclosure level cache (204). That is, the system may be configured such that data that is marked as 'enclosure level cacheable' is more likely to be stored in the enclosure cache (204) that can be accessed by each of the enclosure attached servers (214, 216), rather than being stored in local server cache (220, 222) that can be accessed only by the enclosure attached server (214, 216) that houses the local server cache (220, 222).

Continuing with the example described above in which the enclosure attached servers (214, 216) and the enclosure (202) are used to support a website that hosts videos for sharing amongst users, those video files that are accessed by many enclosure attached servers (214, 216) may be stored in enclosure cache (204) while those videos that are accessed by a small number of enclosure attached servers (214, 216) may be stored in local server cache (220, 222). As such, the system as a whole may perform better when data that is accessed by multiple enclosure attached servers (214, 216) is stored in enclosure cache (204), so that multiple copies of the same data are not stored in local server cache (220, 222) on multiple enclosure attached servers (214, 216). The system as a whole may also perform better when data that is accessed by a single enclosure attached server (214) is stored in local server cache (220) contained in the enclosure attached server (214), such that the shared cache that resides in the enclosure (202) is not filled with data that only a single enclosure attached server (214) utilizes. In the example of FIG. 1, marking, by the enclosure (202), the data as enclosure level cacheable may be carried out, for example, through the use of an expander, FPGA, or other form of computer logic capable of executing computer program instructions that is contained within the enclosure (202).

FIG. 1 also includes a more detailed view of one of the enclosure attached servers (214, 216). The enclosure attached server (214) of FIG. 1 includes at least one computer processor (156) or 'CPU' as well as random access memory (168) ('RAM') which is connected through a high speed memory bus (166) and bus adapter (158) to processor (156) and to other components of the enclosure attached server (214). Stored in RAM (168) is a local server cache management application (126), a module of computer program instructions useful for managing direct attached cache and remote shared cache. In the example of FIG. 1, the local server cache management application (126) can include computer program instructions for requesting access to data that is not contained in the local server cache (204), blocking data that is marked as enclosure level cacheable from being stored in local server cache (220), responding to messages from the enclosure (202) to identify the contents of the local server cache (220), storing data in the local server cache (220) and so on.

Also stored in RAM (168) is an operating system (154). Operating systems useful in managing direct attached cache and remote shared cache according to embodiments of the present invention include UNIX™, Linux™, Microsoft XP™, AIX™, IBM's i5/OS™, and others as will occur to those of skill in the art. The operating system (154) and the cache accepting application (126) in the example of FIG. 1 are shown in RAM (168), but many components of such software typically are stored in non-volatile memory also, such as, for example, on a disk drive (170).

The enclosure attached server (214) of FIG. 1 includes disk drive adapter (172) coupled through expansion bus (160) and bus adapter (158) to processor (156) and other components of the enclosure attached server (214). Disk drive adapter (172) connects non-volatile data storage to the enclosure attached server (214) in the form of disk drive (170). Disk drive adapters useful in computers for managing direct attached cache and remote shared cache according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example enclosure attached server (214) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example enclosure attached server (214) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example enclosure attached server (214) of FIG. 1 includes a communications adapter (167) for data communications with other computers such as enclosure attached server (216) and for data communications with a data communications network (100). Such data communications may be carried out serially through RS-232 connections, through external buses such as a Universal Serial Bus (USW), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing direct attached cache and remote shared cache according to embodiments of the present invention include modems for wired dial-up communications, Ethernet (IEEE 802.3) adapters for wired data communications network communications, and 802.11 adapters for wireless data communications network communications.

Figure 2:
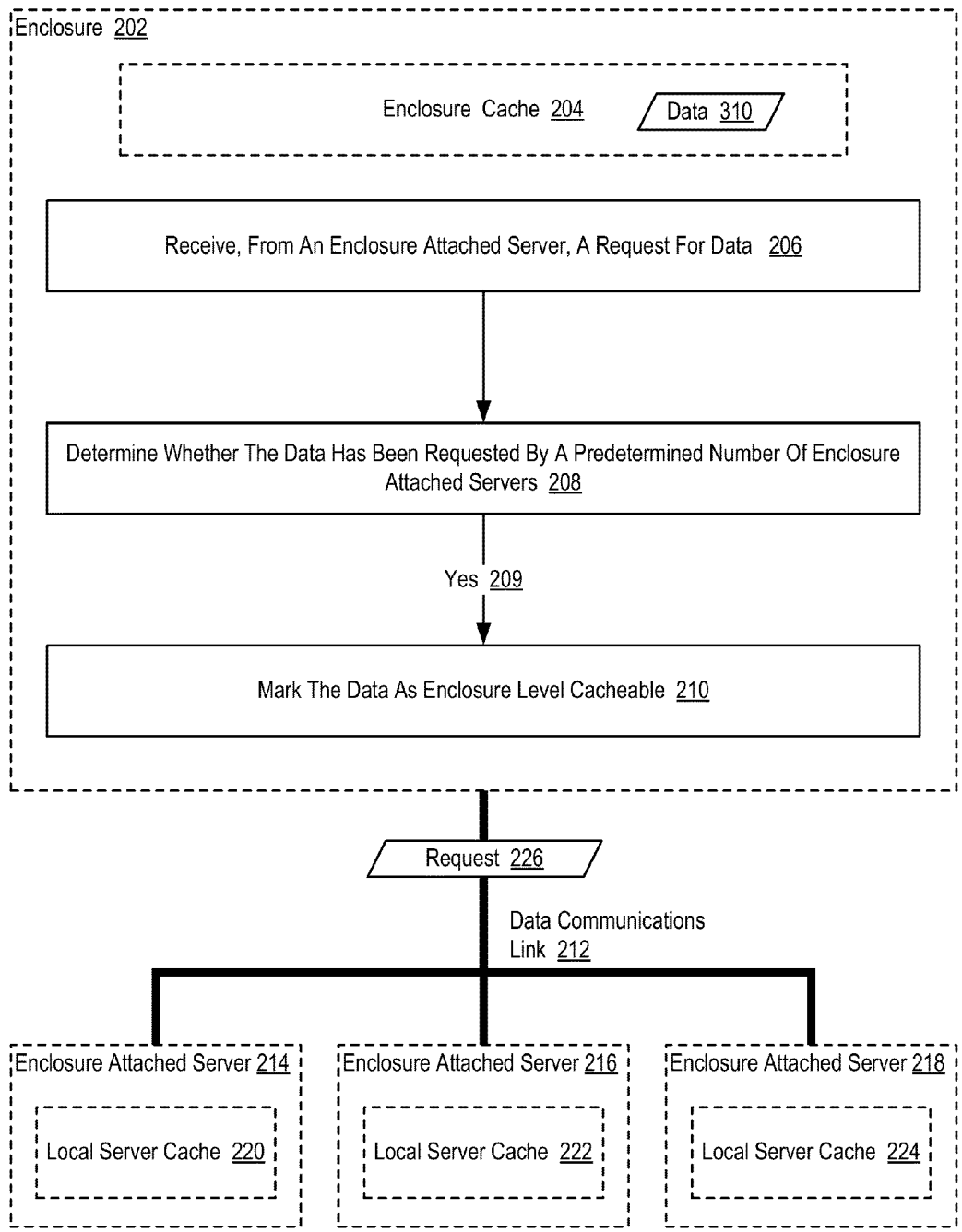
FIG. 2 sets forth a flow chart illustrating an example method for managing direct attached cache and remote shared cache according to embodiments of the present invention.

For further explanation, FIG. 2 sets forth a flow chart illustrating an example method for managing direct attached cache and remote shared cache according to embodiments of the present invention. The example method of FIG. 2 includes an enclosure (202) that includes enclosure cache (204). In the example method of FIG. 2, an enclosure (202) is a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure cache (204) of FIG. 2 may be embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

The example method of FIG. 2 also includes a plurality of enclosure attached servers (214, 216, 218), each of which includes local server cache (220, 222, 224). The enclosure attached servers (214, 216, 218) of FIG. 2 may be embodied, for example, as blade servers mounted in a blade center. The enclosure attached servers (214, 216, 218) of FIG. 2 may include computer processors, computer memory, data communications adapters, and other computing hardware such that the enclosure attached servers (214, 216, 218) operate as a fully functional computer that can run one or more services. The enclosure attached servers (214, 216, 218) of FIG. 2 also include local server cache (220, 222, 224). The local server cache (220, 222, 224) of FIG. 2 may be embodied as relatively fast access memory, such as flash memory, that resides within an enclosure attached server (214, 216, 218). In the example method of FIG. 2, the enclosure cache (204) and the local server cache (220, 222, 224) may be embodied as identical types of computer memory that are addressed identically and provide similar access times.

In the example method of FIG. 2, the enclosure attached servers (214, 216, 218) are coupled for data communications with the enclosure (202) over a data communications link (212). In the example method of FIG. 2, the data communications link (212) may be embodied, for example, as an Ethernet link, a Fibre Channel link, an InfiniBand link, or any other data communications link that enables each of the enclosure attached servers (214, 216, 218) to communicate with the enclosure (202). Alternatively, the data communications link (212) may also be embodied as a computer bus such as a SCSI bus, SAS bus, SATA bus, USB, or other computer bus that can be utilized by enclosure attached servers (214, 216, 218) and the enclosure (202) to perform memory access operations in which the enclosure attached servers (214, 216, 218) access memory contained in the enclosure (202).

The example method of FIG. 2 includes receiving (206), by the enclosure (202) from an enclosure attached server (214, 216, 218), a request (226) for data (310). In the example method of FIG. 2, the request (226) for data (310) can represent a request that is issued by an enclosure attached server (214, 216, 218) to retrieve a file, a document, or some other form of digital data from computer memory in the enclosure (202). In the example method of FIG. 2, the enclosure attached server (214, 216, 218) may issue such a request (226), for example, in response to the enclosure receiving a request for the data from a user, from another server, and so on.

Consider an example in which the enclosure attached servers (214, 216, 218) and the enclosure (202) are used to support a website that hosts videos for sharing amongst users. In such an example, a request from a user of the website to view a particular video may be received by one of the enclosure attached servers (214). In such an example, the enclosure attached server (214) may search computer memory within the enclosure attached server (214) to determine if the enclosure attached server (214) has a copy of the requested video file. For example, the enclosure attached server (214) may search its local server cache (220) to determine a copy of the requested video file is stored in the local server cache (220). In the event that a copy of the requested video file is not stored in the local server cache (220), the enclosure attached server (214) may subsequently issue a request (226) for data and transmit the request to the enclosure (202), which contains computer memory that is shared by one or more enclosure attached servers (214, 216, 218). As such, the enclosure (202) can receive (206) the request (226) for data over the data communications link (212) coupling the enclosure (202) and the enclosure attached servers (214, 216, 218). The request (226) for data may include, for example, a file name for the data, an identification of an end user that requested the data from the enclosure attached server (214, 216, 218), and so on.

The example method of FIG. 2 also includes determining (208), by the enclosure (202), whether the data (310) has been requested by a predetermined number of enclosure attached servers (214, 216, 218). Continuing with the example described above in which the enclosure attached servers (214, 216, 218) and the enclosure (202) are used to support a website that hosts videos for sharing amongst users, a user initiated request to view a particular video may be serviced by any number of the enclosure attached servers (214, 216, 218). For example, a request from a first user for the particular video may be received by enclosure attached server (214) while a request from a second user for the same video may be received by a different enclosure attached server (216). In such an example, it is likely that the first time the enclosure attached server (214) receives a request for the video, the video will not be contained in local server cache (220) of the enclosure attached server (214) and the enclosure attached server (214) will therefore need to generate a request (226) for the data (310) and transmit the request (226) to the enclosure (202). Likewise, it is likely that the first time the enclosure attached server (216) receives a request for the video, the video will not be contained in local server cache (222) of the enclosure attached server (216) and the enclosure attached server (216) will therefore need to generate a request (226) for the data and transmit the request (226) to the enclosure (202). In such an example, the video has therefore been requested by two enclosure attached servers (214, 216).

In the example method of FIG. 2, determining (208) whether the data has been requested by a predetermined number of enclosure attached servers (214, 216, 218) may therefore be carried out by the enclosure (202) retaining information identifying the number of distinct enclosure attached servers (214, 216, 218) that have requested the data. The enclosure (202) may also retain information identifying each enclosure attached server (214, 216, 218) has requested the data (310), information identifying the number of times that each enclosure attached server (214, 216, 218) has requested the data (310), and so on. The information may be retained by the enclosure (202), for example, by storing the information in a table, database, or other data structure that is stored in computer memory that is accessible by the enclosure (202). In the example method of FIG. 2, determining (208) whether the data has been requested by a predetermined number of enclosure attached servers (214, 216, 218) may include comparing the number of enclosure attached servers (214, 216, 218) that have requested the data to a predetermined number that serves as a threshold value.

The example method of FIG. 2 also includes marking (210), by the enclosure (202), the data (310) as enclosure level cacheable. In the example of FIG. 2, marking (210) the data (310) as enclosure level cacheable is carried out in response to affirmatively (209) determining that the data has been requested by a predetermined number of enclosure attached servers (214, 216, 218). In the example of FIG. 2, each enclosure attached server (214, 216, 218) may include computer program instructions that prevent data that is marked (210) as 'enclosure level cacheable' from being stored in local server cache (220, 222, 224). The enclosure (202) may also include computer program instructions that gives special priority to data that is marked (210) as 'enclosure level cacheable' when populating and maintaining the enclosure level cache (204). That is, the system may be configured such that data that is marked (210) as 'enclosure level cacheable' is more likely to be stored in the enclosure cache (204) that can be accessed by each of the enclosure attached servers (214, 216, 218), rather than being stored in local server cache (220, 222, 224) that can be accessed only by the enclosure attached server (214, 216, 218) that houses the local server cache (220, 222, 224).

Continuing with the example described above in which the enclosure attached servers (214, 216, 218) and the enclosure (202) are used to support a website that hosts videos for sharing amongst users, those video files that are accessed by many enclosure attached servers (214, 216, 218) may be stored in enclosure cache (204) while those videos that are accessed by a small number of enclosure attached servers (214, 216, 218) may be stored in local server cache (220, 222, 224). As such, the system as a whole may perform better when data that is accessed by multiple enclosure attached servers (214, 216, 218) is stored in enclosure cache (204), so that multiple copies of the same data are not stored in local server cache (220, 222, 224) on multiple enclosure attached servers (214, 216, 218). The system as a whole may also perform better when data that is accessed by a single enclosure attached server (214) is stored in local server cache (220) contained in the enclosure attached server (214), such that the shared cache that resides in the enclosure (202) is not filled with data that only a single enclosure attached server (214) utilizes.

Figure 3:
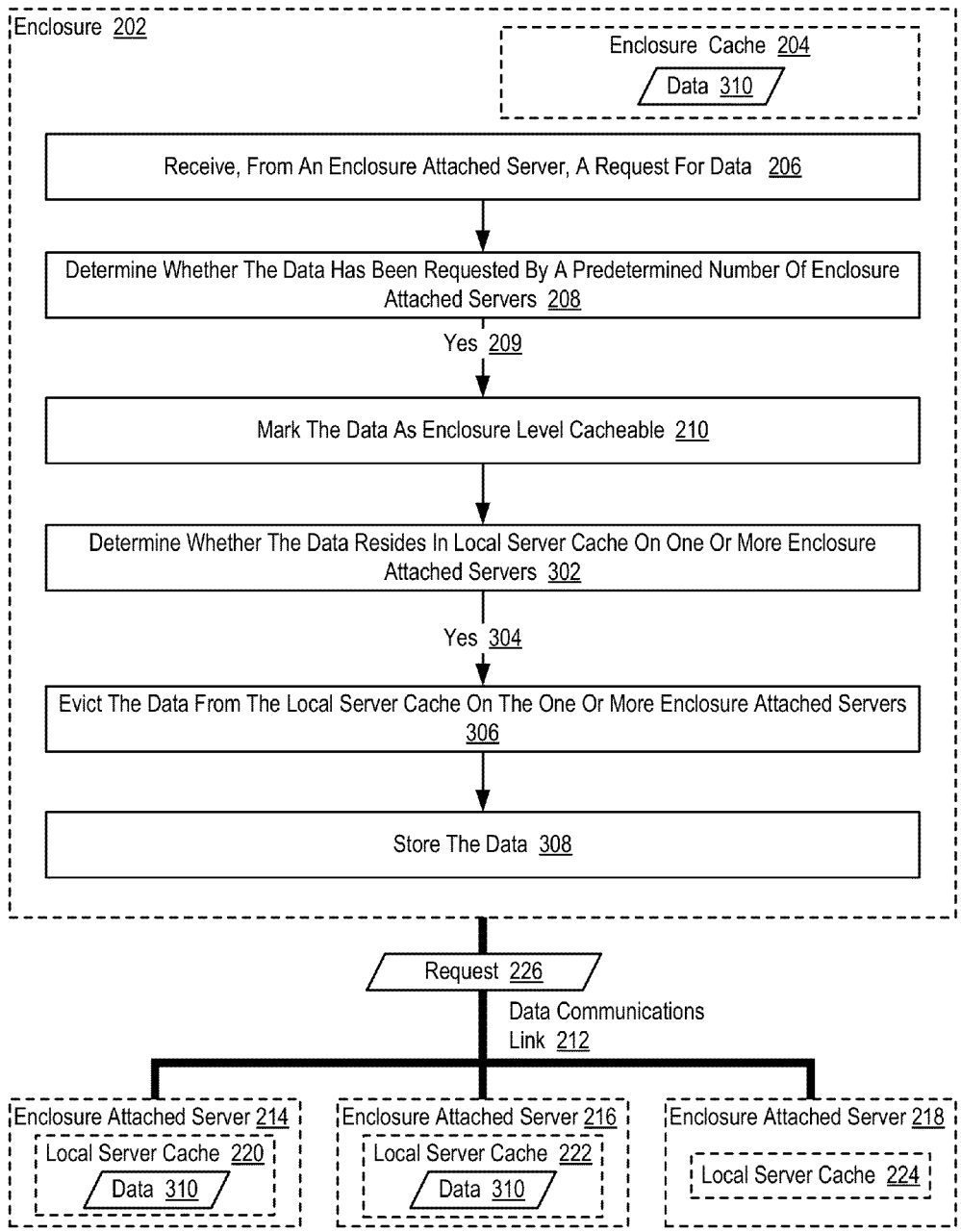
FIG. 3 sets forth a flow chart illustrating an additional example method for managing direct attached cache and remote shared cache according to embodiments of the present invention.

For further explanation, FIG. 3 sets forth a flow chart illustrating an additional example method for managing direct attached cache and remote shared cache according to embodiments of the present invention. The example method of FIG. 3 is similar to the example method of FIG. 2, as it also includes receiving (206) a request (226) for data, determining (208) whether the data has been requested by a predetermined number of enclosure attached servers (214, 216, 218), and marking (210) the data as enclosure level cacheable.

The example method of FIG. 3 also includes determining (208), by the enclosure (202), whether the data (310) resides in local server cache (220, 222, 224) on one or more enclosure attached servers (214, 216, 218). In the example method of FIG. 3, determining (208) whether the data (310) resides in local server cache on one or more enclosure attached servers (214, 216, 218) may be carried out, for example, by sending a message from the enclosure (202) to each of the enclosure attached servers (214, 216, 218). The message sent from the enclosure (202) to each of the enclosure attached servers (214, 216, 218) may include information identifying the data (310), such as a file name or other identifier of the data (310). In such an example, those enclosure attached servers (214,

216, 218) that have a copy of the data (310) stored in their local server cache (220, 222, 224) may respond with a particular code, while those enclosure attached servers (214, 216, 218) that do not have a copy of the data (310) stored in their local server cache (220, 222, 224) may respond with a another code.

The example method of FIG. 3 also includes evicting (306) the data from the local server cache (220, 222, 224) on the one or more enclosure attached servers (214, 216, 218). In the example method of FIG. 3, evicting (306) the data from the local server cache (220, 222, 224) on the one or more enclosure attached servers (214, 216, 218) occurs in response to affirmatively (304) determining that the data (310) resides in local server cache (220, 222, 224) on one or more enclosure attached servers (214, 216, 218). In the example method of FIG. 3, evicting (306) the data from the local server cache (220, 222, 224) on the one or more enclosure attached servers (214, 216, 218) may be carried out, for example, by the enclosure (202) sending an eviction message to each enclosure attached server (214, 216, 218) that includes the data (310) in its local server cache (220, 222, 224). In response to such an eviction message, each enclosure attached server (214, 216, 218) may be configured to execute computer program instructions that remove the data (310) from its local server cache (220, 222, 224).

The example method of FIG. 3 also includes storing (308), in the enclosure cache (204), the data (310). Continuing with the example described above in which the enclosure attached servers (214, 216, 218) and the enclosure (202) are used to support a website that hosts videos for sharing amongst users, assume that the enclosure (202) has determined that a particular video that has been requested by multiple enclosure attached servers (214, 216, 218) is stored in the local server cache (220, 222) of multiple enclosure attached servers (214, 216). Assume that the file size of the video is 1 gigabyte (GB). In such an example, the video is consuming 2 GB of space in local server cache (220, 222). If the video were stored in enclosure cache (204), however, the video would only consume 1 GB of the total cache available in the system and still be available to all enclosure attached servers (214, 216). As such, the enclosure (202) may cause the video to be evicted from the local server cache (220, 222) of the enclosure attached servers (214, 216) and instead stored in the enclosure cache (204).

Readers will appreciate that in addition to optimizing the usage of total system cache, storing data (310) that is accessed by multiple enclosure attached servers (214, 216) in enclosure cache (204) can provide additional benefits. For example, in order to maintain coherency between local server cache (220, 222, 224) and memory on the enclosure (202), such as hard disk memory, a particular file stored in local server cache (220) of one enclosure attached server (214) may be locked from access by other enclosure attached servers (216, 218). The file stored in local server cache (220) of one enclosure attached server (214) may be locked from access by other enclosure attached servers (216, 218) such that the other enclosure attached servers (216, 218) cannot update the file and thereby cause the copy of the file stored in local server cache (220) of one enclosure attached server (214) to be out-of-date. As such, when an enclosure attached server (216, 218) attempts to access a file that is stored in local server cache (220) of another enclosure attached server (214), the enclosure attached server (216, 218) attempting to access a file may have to wait for the other enclosure attached server (214) to release a lock on the file. By storing a file that is accessed by multiple enclosure attached servers (214, 216, 218) in enclosure cache (204), however, such a delay in accessing the file is not experienced.

Figure 4:
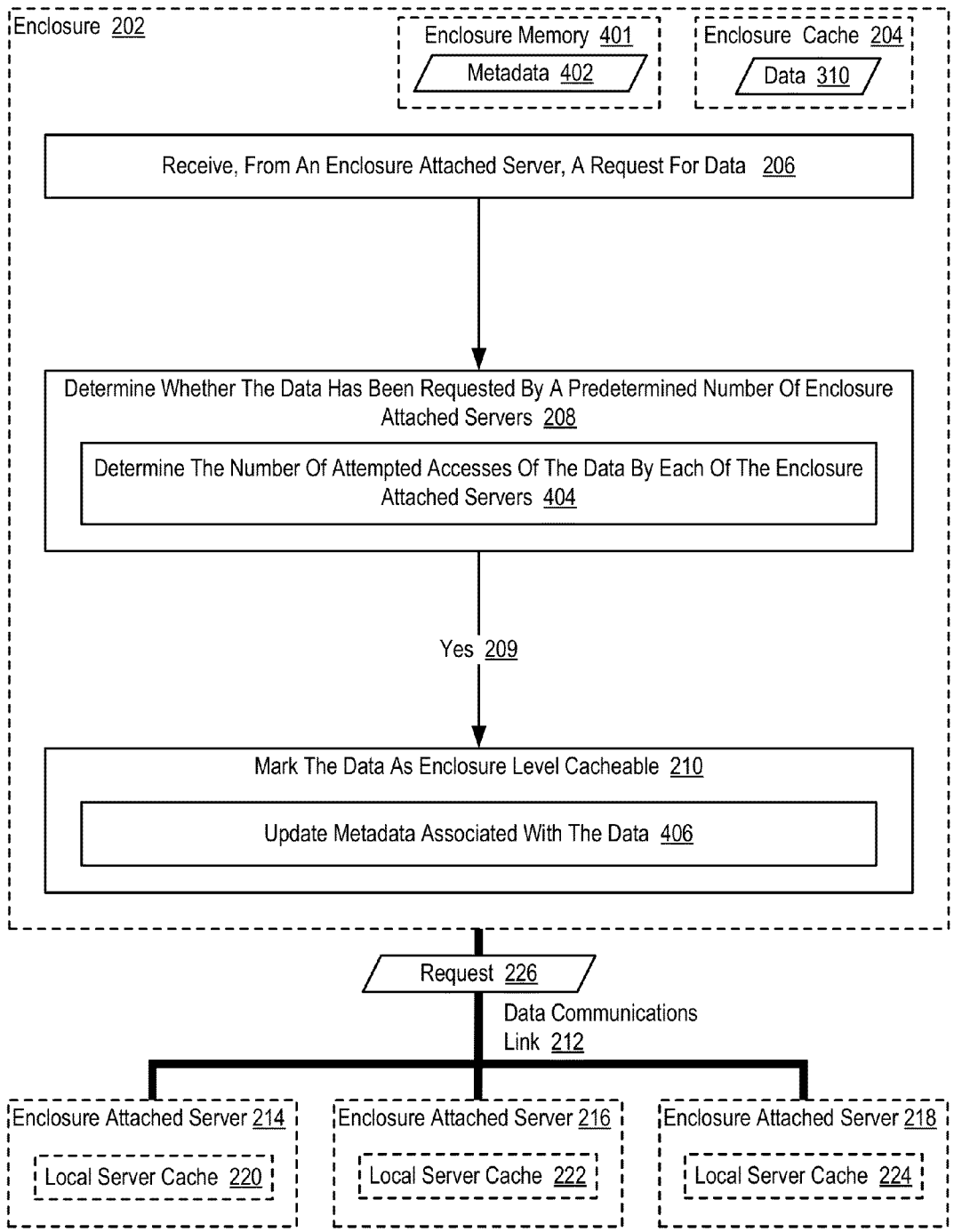
FIG. 4 sets forth a flow chart illustrating an additional example method for managing direct attached cache and remote shared cache according to embodiments of the present invention.

For further explanation, FIG. 4 sets forth a flow chart illustrating an additional example method for managing direct attached cache and remote shared cache according to embodiments of the present invention. The example method of FIG. 4 is similar to the example method of FIG. 2, as it also includes receiving (206) a request (226) for data, determining (208) whether the data has been requested by a predetermined number of enclosure attached servers (214, 216, 218), and marking (210) the data as enclosure level cacheable.

In the example method of FIG. 4, marking (210) the data as enclosure level cacheable includes updating (406), by the enclosure (202), metadata (402) associated with the data (310). In the example method of FIG. 4, metadata (402) associated with the data (310) may be embodied as information describing various aspects of the data (310). The metadata (402) associated with the data (310) may include, for example, information identifying the number of enclosure attached servers (214, 216, 218) that have requested the data (310), information identifying the which enclosure attached servers (214, 216, 218) that have requested the data (310), information identifying the number of times one or more enclosure attached servers (214, 216, 218) have requested the data (310), and so on. In the example method of FIG. 4, the metadata (402) is depicted as being stored in enclosure memory (401). Such enclosure memory (401) may be embodied as, for example, a hard disk or other form of non-cache memory. Alternatively, the metadata (402) may be stored in the enclosure cache (204) itself.

In the example method of FIG. 4, determining (208) whether the data has been requested by a predetermined number of enclosure attached servers (214, 216, 218) can include determining (404), by the enclosure (202), the number of attempted accesses of the data (310) by each of the enclosure attached servers (214, 216, 218). In the example method of FIG. 4, the enclosure (202) may track the number of attempted accesses of the data (310) by each of the enclosure attached servers (214, 216, 218), for example, by storing such information in metadata (402) associated with the data (310). In the example method of FIG. 4, determining (404) the number of attempted accesses of the data (310) by each of the enclosure attached servers (214, 216, 218) may therefore be carried out by retrieving such information from the metadata (402).

Readers will appreciate that the number of attempted accesses of the data (310) by each of the enclosure attached servers (214, 216, 218) may be utilized to determine where the data (310) should be stored. Consider an example in which the data (310) is accessed by every enclosure attached server (214, 216, 218), such that the data (310) is marked (210) as being enclosure level cacheable and the data (310) is therefore stored in the enclosure cache (204). Assume in such an example, however, that enclosure attached server (214) and enclosure attached server (216) have only attempted to access the data (310) once while enclosure attached server (218) has attempted to access the data (310) thousands of times. In such an example, the system may operate more efficiently if the data (310) were stored in the local server cache (224) of the enclosure attached server (218) that frequently accesses the data (310), thereby freeing up space in the enclosure cache (204) for data that is accessed more frequently by the other enclosure attached servers (214, 216). In such an example, the number of attempted accesses of the data (310) by each of the enclosure attached servers (214, 216, 218) may therefore be compared against a threshold such that if one of the enclosure attached servers (214, 216, 218) is responsible for more than a predetermined percentage of all accesses of the data (310), the data (310) is moved to local server cache (220, 222, 224) on the enclosure attached server (214, 216, 218) that accesses the data (310) most frequently.

Figure 5:
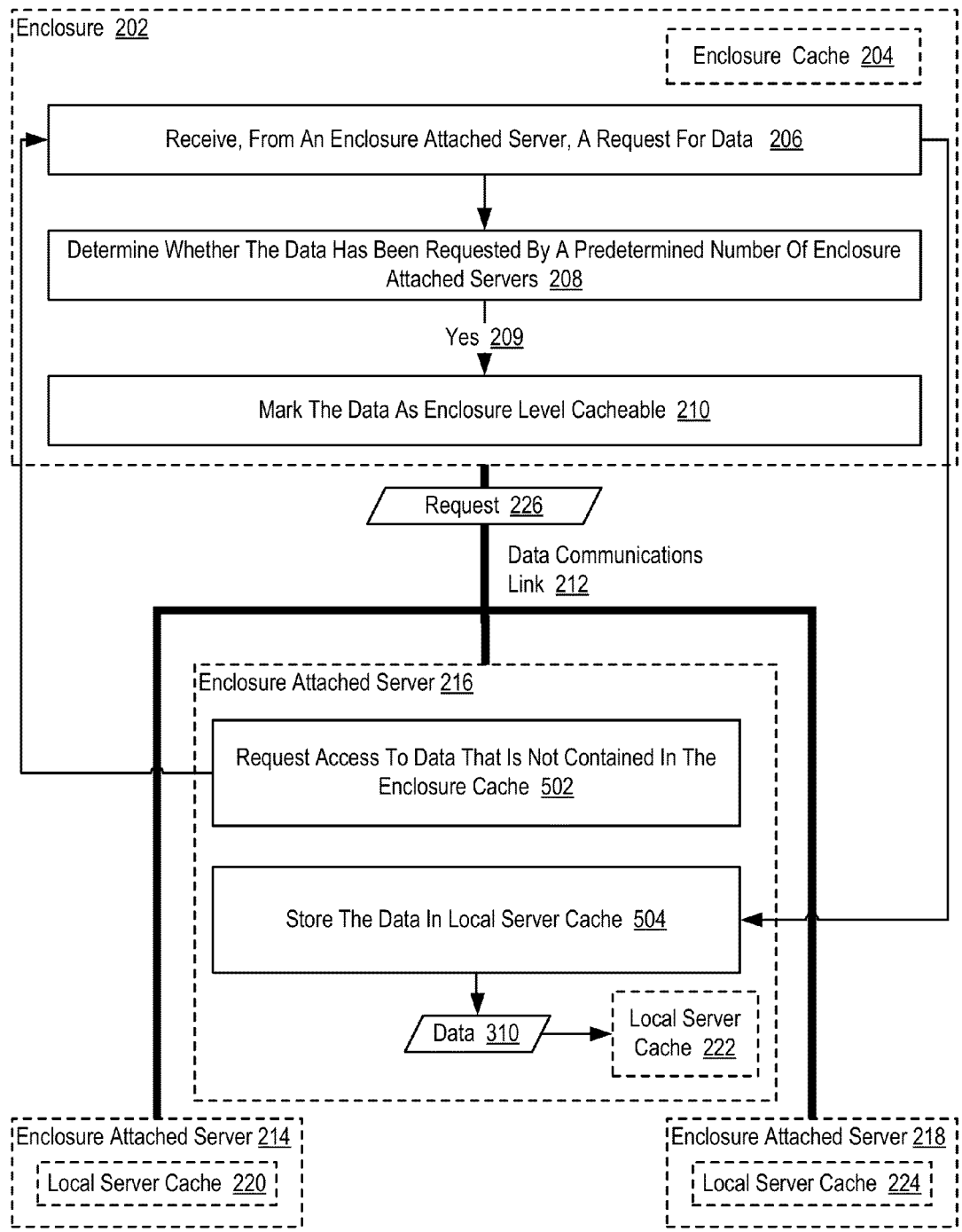
FIG. 5 sets forth a flow chart illustrating an additional example method for managing direct attached cache and remote shared cache according to embodiments of the present invention.

For further explanation, FIG. 5 sets forth a flow chart illustrating an additional example method for managing direct attached cache and remote shared cache according to embodiments of the present invention. The example method of FIG. 5 is similar to the example method of FIG. 2, as it also includes receiving (206) a request (226) for data, determining (208) whether the data has been requested by a predetermined number of enclosure attached servers (214, 216, 218), and marking (210) the data as enclosure level cacheable.

The example method of FIG. 5 also includes requesting (502), by an enclosure attached server (216), access to data (310) that is not contained in the enclosure cache (204). Readers will appreciate that prior to requesting the data (310) from the enclosure (202), the enclosure attached server (216) may initially check for the data (310) in its own local server cache (222) and only issue a request (226) to the enclosure (202) when the data (310) is not contained in its own local server cache (222). In the event that the data (310) is also not contained in the enclosure cache (204), such an access may represent the first access of the data (310) by any of the enclosure attached servers (216). In such an example, the enclosure attached server (216) may store (504) the data (310) in local server cache (222) for subsequent usage by the enclosure attached server (216). Readers will appreciate that in some cases, the data (310) may not be contained in the enclosure cache (204) because the data (310) is contained in the local server cache (220, 224) of one of the other enclosure attached servers (214, 218). In such an example, a request for the data (310) from the enclosure attached server (216) may also trigger the data (310) to be stored in the enclosure cache (204).

Example embodiments of the present invention are described largely in the context of a fully functional computer system for managing direct attached cache and remote shared cache. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for managing direct attached cache and remote shared cache, the apparatus comprising a computer processor, a computer memory operatively coupled to the computer processor, the computer memory having disposed within it computer program instructions that, when executed by the computer processor, cause the apparatus to carry out the steps of:
   receiving from an enclosure attached server, by an enclosure that includes enclosure cache, a request for data;
   determining, by the enclosure, whether the data has been requested by a predetermined number of enclosure attached servers;
   responsive to determining that the data has been requested by a predetermined number of enclosure attached servers, marking, by the enclosure, the data as enclosure level cacheable;
   determining, by the enclosure, whether the data resides in local server cache on one or more enclosure attached servers; and
   responsive to determining that the data resides in local server cache on one or more enclosure attached servers, evicting the data from the local server cache on the one or more enclosure attached servers.

2. The apparatus of claim 1 further comprising computer program instructions that, when executed by the computer processor, cause the apparatus to carry out the step of storing, in the enclosure cache, the data.

3. The apparatus of claim 1 wherein marking the data as enclosure level cacheable further comprises updating, by the enclosure, metadata associated with the data.

4. The apparatus of claim 1 wherein determining whether the data has been requested by a predetermined number of enclosure attached servers further comprises determining, by the enclosure, the number of attempted accesses of the data by each of the enclosure attached servers.

5. The apparatus of claim 1 further comprising computer program instructions that, when executed by the computer processor, cause the apparatus to carry out the steps of:
   requesting, by an enclosure attached server, access to data that is not contained in the enclosure cache; and
   storing, by the enclosure attached server, the data in local server cache.

6. A computer program product for managing direct attached cache and remote shared cache, the computer program product disposed upon a computer readable medium, wherein the computer readable medium is not a signal, the computer program product comprising computer program instructions that, when executed, cause a computer to carry out the steps of:
   receiving from an enclosure attached server, by an enclosure that includes enclosure cache, a request for data;
   determining, by the enclosure, whether the data has been requested by a predetermined number of enclosure attached servers;
   responsive to determining that the data has been requested by a predetermined number of enclosure attached servers, marking, by the enclosure, the data as enclosure level cacheable;
   determining, by the enclosure, whether the data resides in local server cache on one or more enclosure attached servers; and
   responsive to determining that the data resides in local server cache on one or more enclosure attached servers, evicting the data from the local server cache on the one or more enclosure attached servers.

7. The computer program product of claim 6 further comprising computer program product comprising computer program instructions that, when executed, cause the computer to carry out the step of storing, in the enclosure cache, the data.

8. The computer program product of claim 6 wherein marking the data as enclosure level cacheable further comprises updating, by the enclosure, metadata associated with the data.

9. The computer program product of claim 6 wherein determining whether the data has been requested by a predetermined number of enclosure attached servers further comprises determining, by the enclosure, the number of attempted accesses of the data by each of the enclosure attached servers.

10. The computer program product of claim 6 further comprising computer program product comprising computer program instructions that, when executed, cause the computer to carry out the steps of:
   requesting, by an enclosure attached server, access to data that is not contained in the enclosure cache; and
   storing, by the enclosure attached server, the data in local server cache.

11. The computer program product of claim 6 wherein the computer readable medium comprises a storage medium.

\* \* \* \* \*